(12) United States Patent
Lee et al.

(10) Patent No.: US 12,089,191 B2
(45) Date of Patent: Sep. 10, 2024

(54) METHOD AND DEVICE FOR TRANSMITTING OR RECEIVING WIRELESS SIGNAL IN WIRELESS COMMUNICATION SYSTEM

(71) Applicant: LG Electronics Inc., Seoul (KR)

(72) Inventors: Hyunho Lee, Seoul (KR); Duckhyun Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 339 days.

(21) Appl. No.: 17/608,406

(22) PCT Filed: May 4, 2020

(86) PCT No.: PCT/KR2020/005852
§ 371 (c)(1),
(2) Date: Nov. 2, 2021

(87) PCT Pub. No.: WO2020/222598
PCT Pub. Date: Nov. 5, 2020

(65) Prior Publication Data
US 2022/0312412 A1 Sep. 29, 2022

(30) Foreign Application Priority Data
May 2, 2019 (KR) .................. 10-2019-0051841

(51) Int. Cl.
*H04J 3/00* (2006.01)
*H04W 72/0446* (2023.01)
(52) U.S. Cl.
CPC .............................. *H04W 72/0446* (2013.01)

(58) Field of Classification Search
CPC . H04W 72/0446; H04W 84/12; H04W 84/18; H04W 28/04; H04W 28/06
See application file for complete search history.

(56) References Cited

U.S. PATENT DOCUMENTS 11,172,503 B2 * 11/2021 Li .................... H04W 72/0446
2012/0063399 A1 * 3/2012 Kiyoshima .......... H04L 1/1854
370/329
(Continued)

FOREIGN PATENT DOCUMENTS

WO WO2019028276 7/2019

OTHER PUBLICATIONS

Huawei, HiSilicon, "Discussion on flexible periodicities for Configured Grant/SPS," R2-1904374, 3GPP TSG RAN WG2 Meeting 105bis, Xi'an, China, Apr. 8-12, 2019, 7 pages.
(Continued)

*Primary Examiner* — Phuongchau Ba Nguyen
(74) *Attorney, Agent, or Firm* — Fish & Richardson P.C.

(57) ABSTRACT

The present invention relates to a wireless communication system, and may comprise receiving a period and additional information for a semi-persistent scheduling (SPS) operation from a base station, determining a transmission resource based on the period and the additional information for the SPS operation, and receiving downlink data or transmitting uplink data in the transmission resource, wherein data traffic including the downlink data and the uplink data has a period corresponding to a non-integer multiple of a reference time unit, and the additional information is determined based on the period of the data traffic.

13 Claims, 15 Drawing Sheets

(56) References Cited

U.S. PATENT DOCUMENTS

| | | | | |
|---|---|---|---|---|
| 2013/0142140 A1* | 6/2013 | Tseng | ................... | H04W 76/20 |
| | | | | 370/329 |
| 2017/0026942 A1* | 1/2017 | Vajapeyam | ........... | H04W 72/04 |
| 2017/0289733 A1* | 10/2017 | Rajagopal | ............. | H04L 5/0082 |
| 2018/0288746 A1* | 10/2018 | Zhang | ................... | H04L 1/0031 |
| 2019/0082454 A1* | 3/2019 | Shi | ....................... | H04W 72/20 |
| 2019/0313436 A1* | 10/2019 | Lee | ....................... | H04L 5/0051 |
| 2020/0053768 A1* | 2/2020 | Chen | .................... | H04W 88/04 |
| 2021/0266932 A1* | 8/2021 | Liu | ..................... | H04W 72/535 |

OTHER PUBLICATIONS

Huawei, HiSilicon, "Discussion on message periodicities with non-integer multiple of NR supported CG/SPS periodicities," R1-1904714, 3GPP TSG RAN WG1 Meeting #96bis, Xi'an, China, Apr. 8-12, 2019, 5 pages.

Nokia, Nokia Shanghai Bell, "Support for TSC message periodicities of non-integer multiple of NR CG/SPS periodicities," R2-1904413, 3GPP TSG-RAN WG2 Meeting #105bis, Xi'an, China, Apr. 8-12, 2019, 9 pages.

PCT International Search Report and Written Opinion in International Appln No. PCT/KR2020/005852, dated Aug. 24, 2020, 16 pages.

* cited by examiner

[FIG. 1]
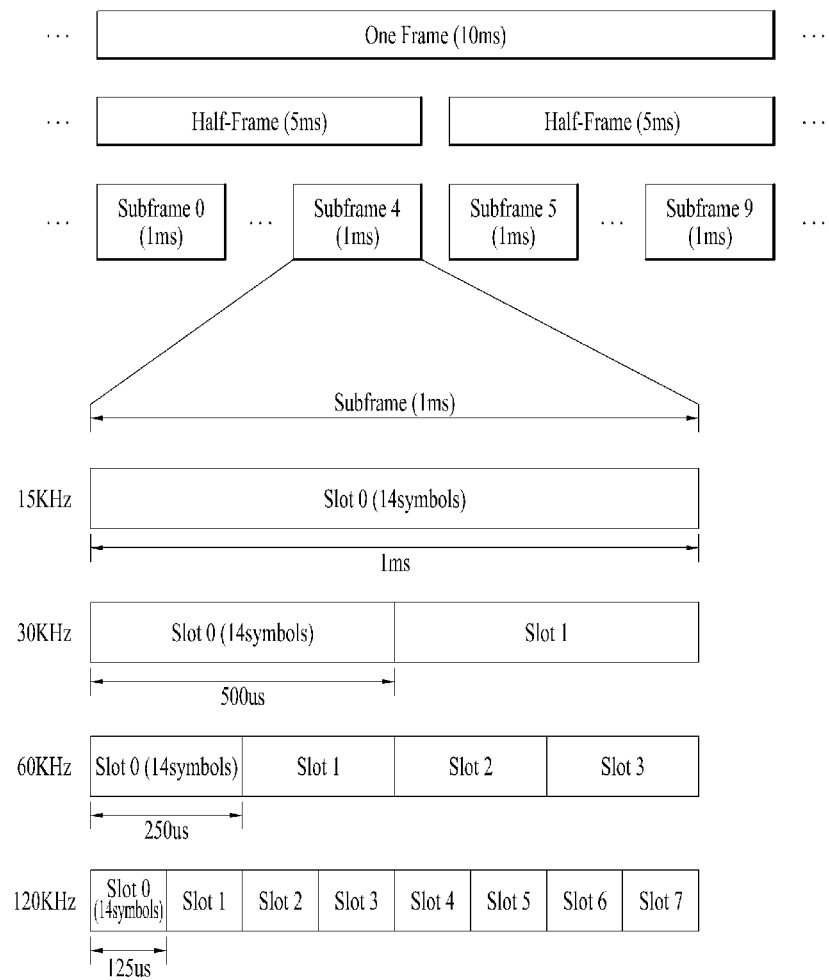

[FIG. 2]
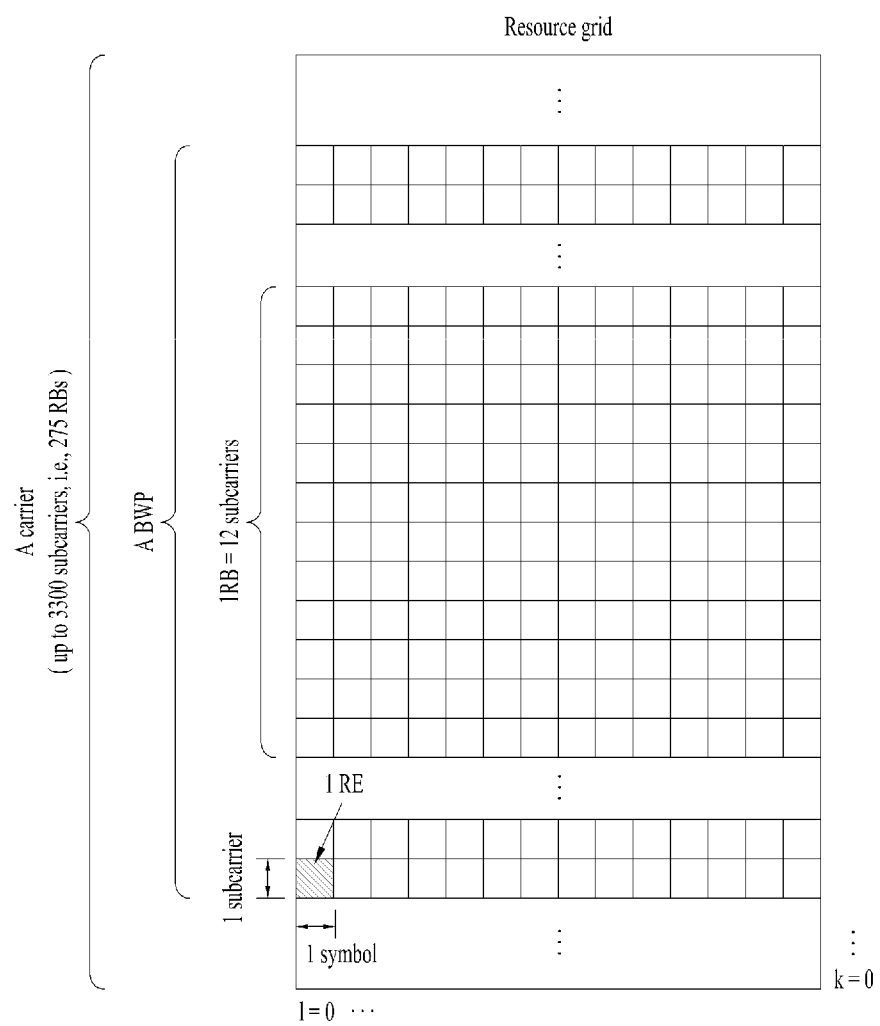

[FIG. 3]
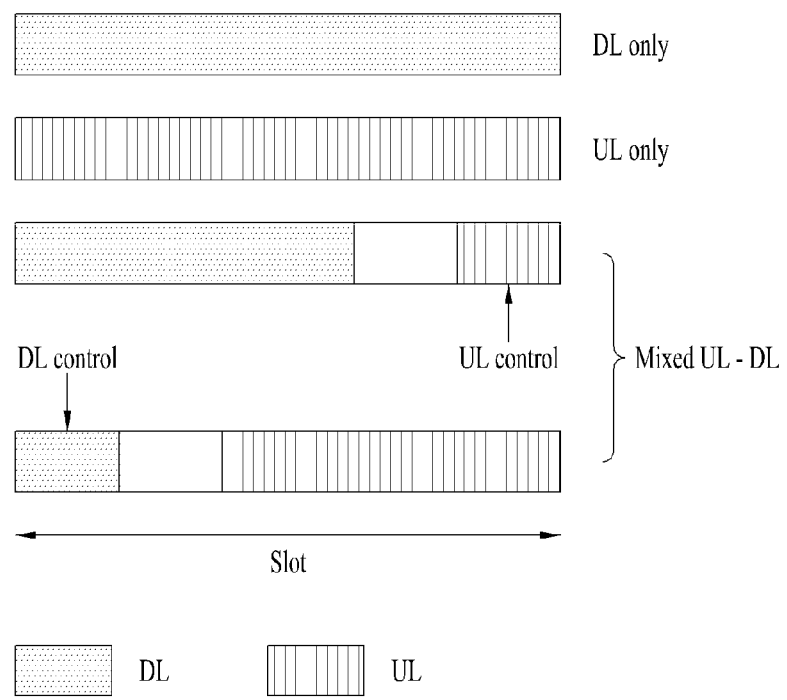

[FIG. 4]
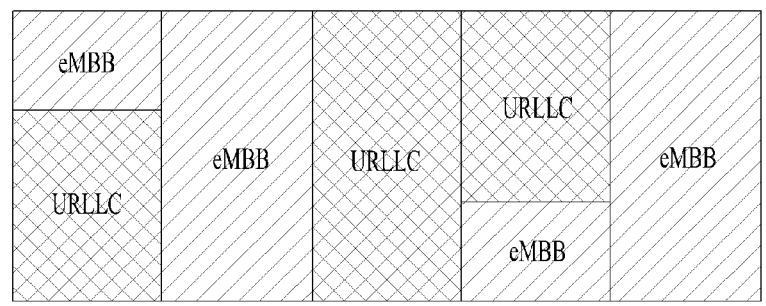
(a) Scheduler-based resource sharing
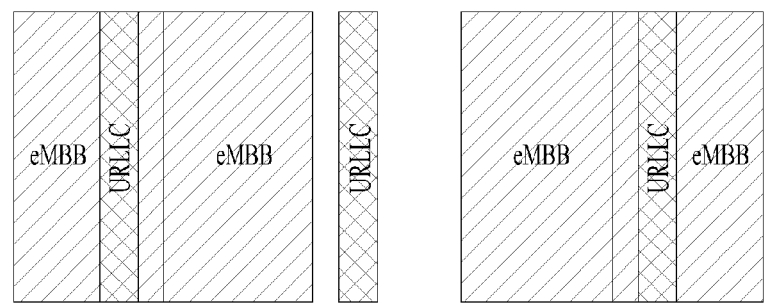
(b) Preemption-based resource sharing
[FIG. 5]
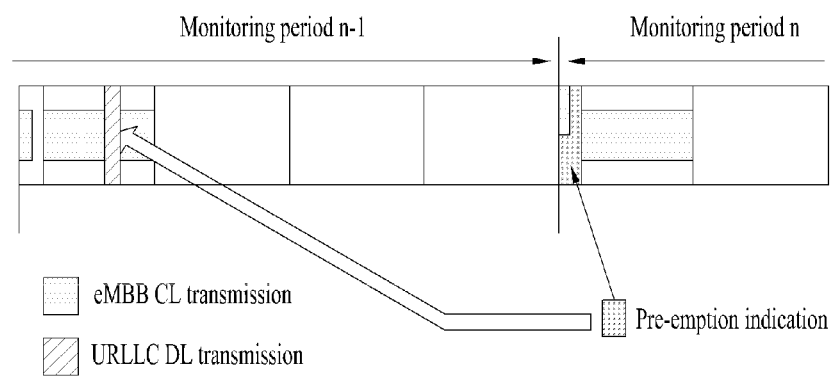

[FIG. 6]
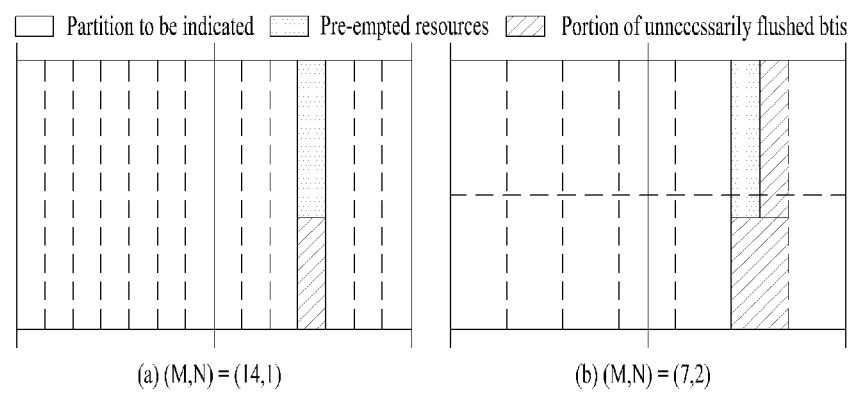
[FIG. 7]
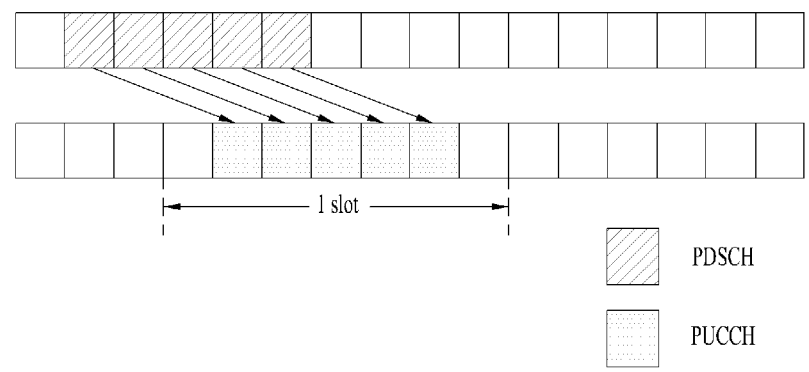

[FIG. 8]
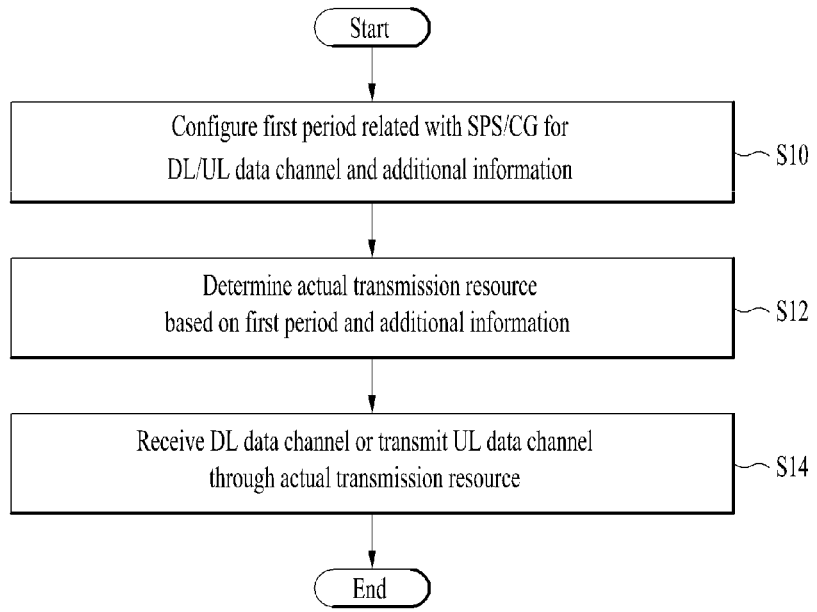
[FIG. 9]
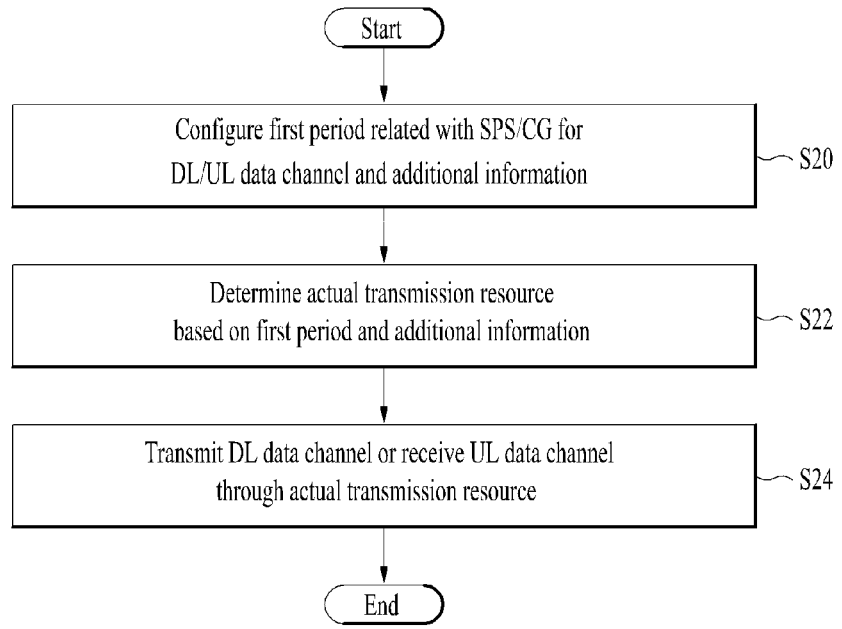

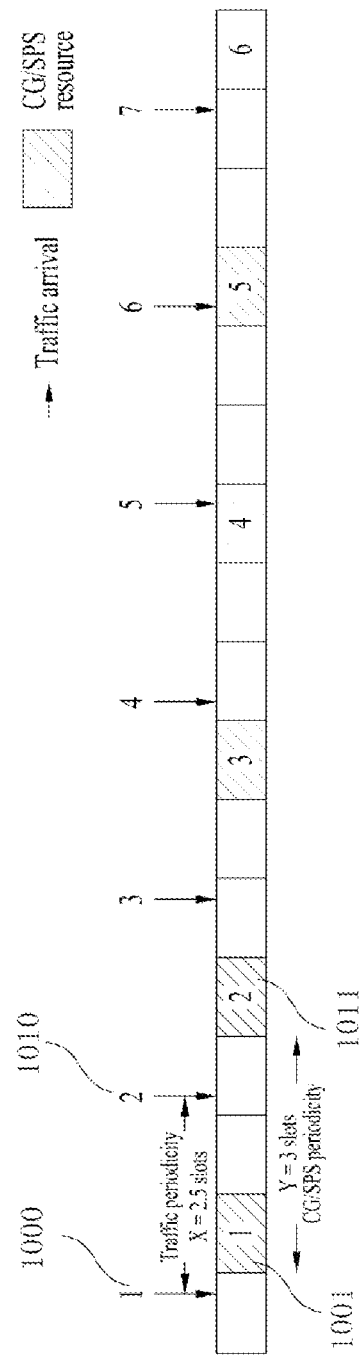
[FIG. 10]

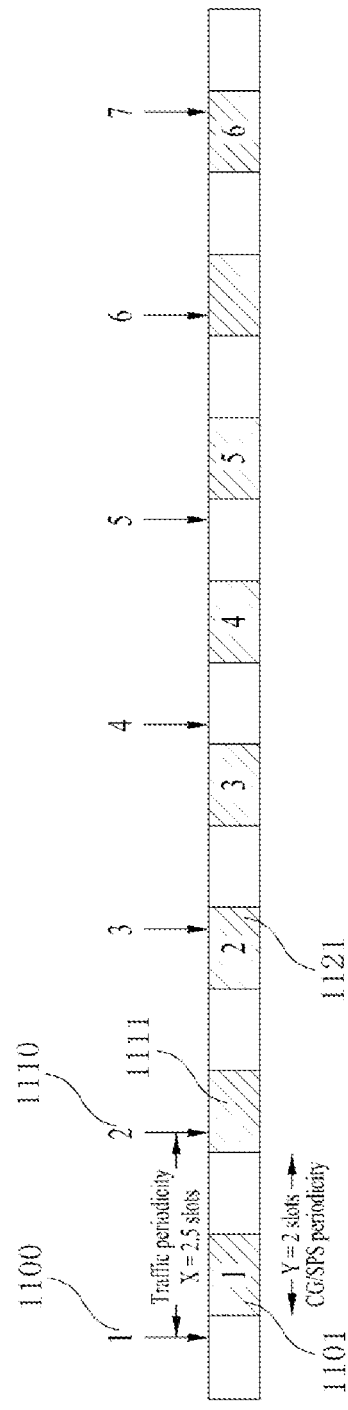
[FIG. 11]

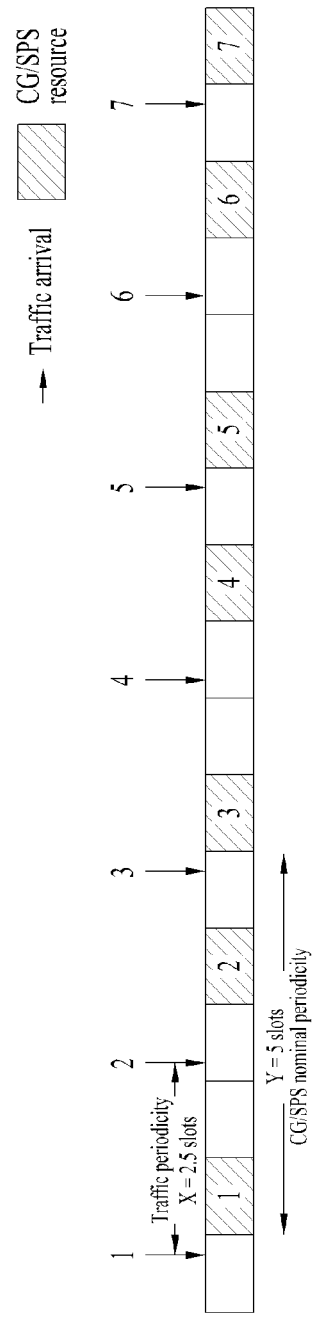
[FIG. 12]

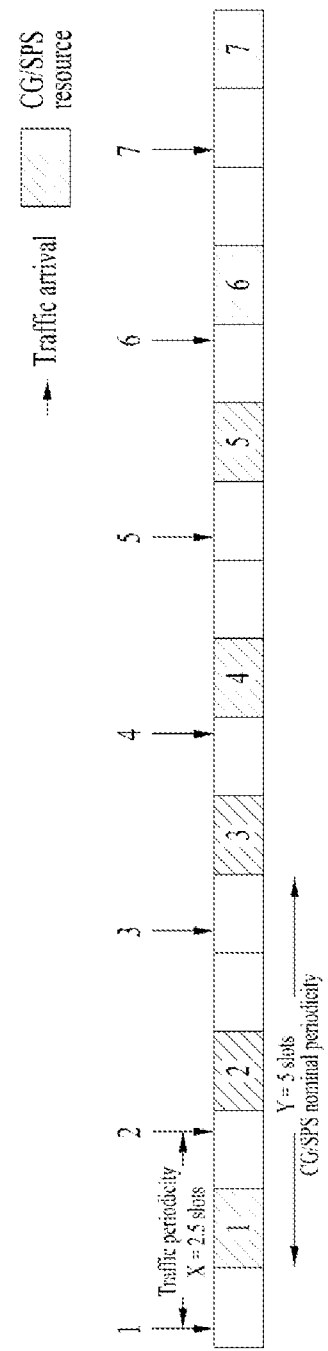

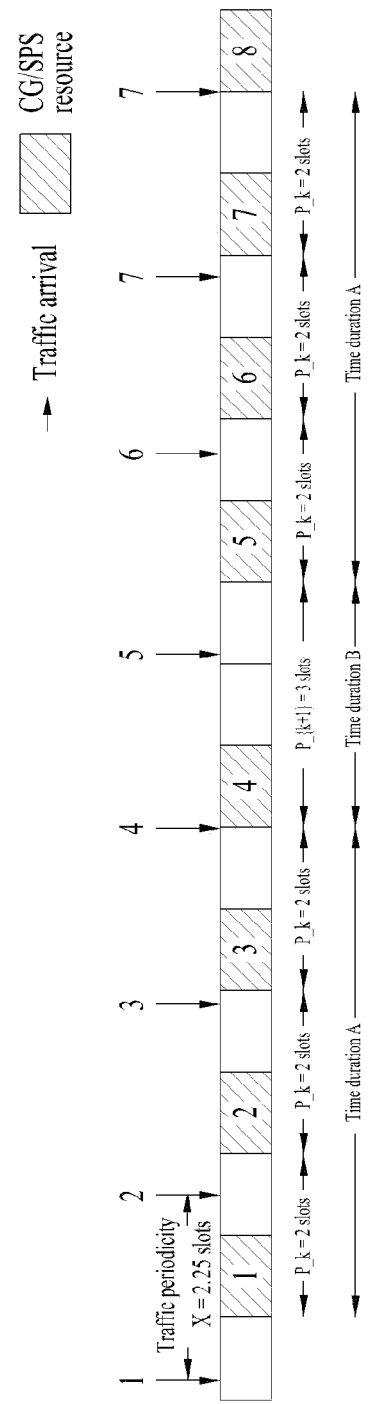
[FIG. 14]

[FIG. 15]
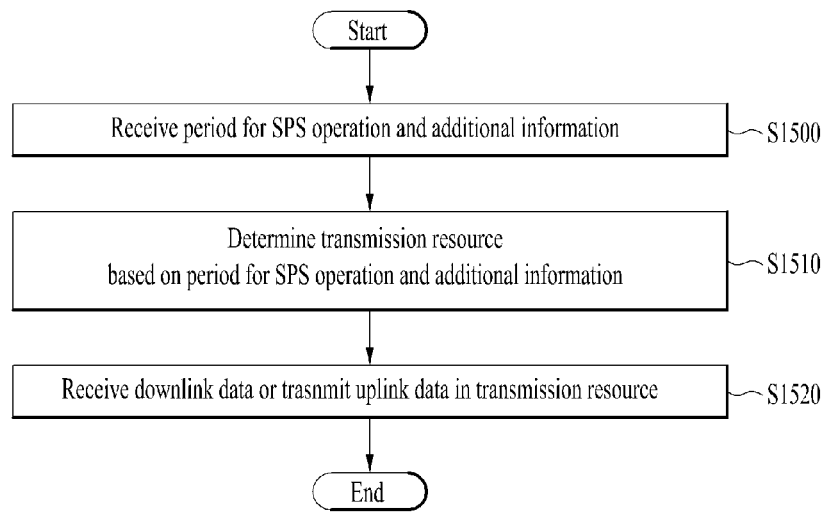
[FIG. 16]
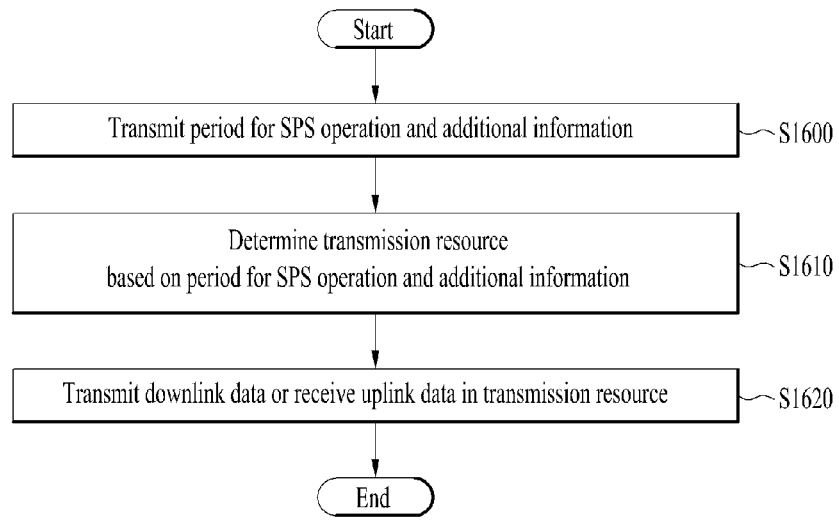

[FIG. 17]
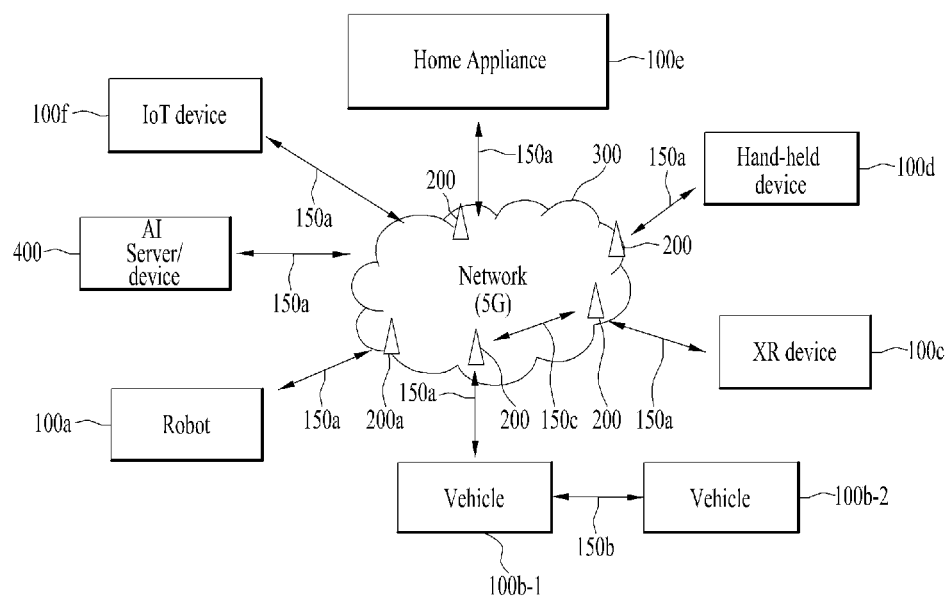
[FIG. 18]
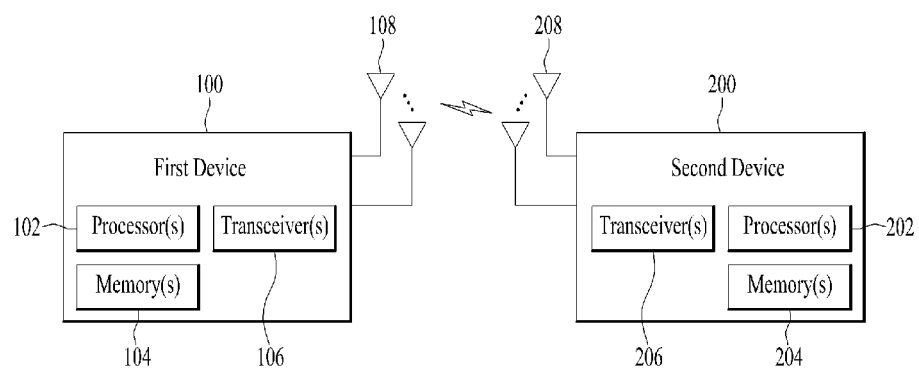

[FIG. 19]
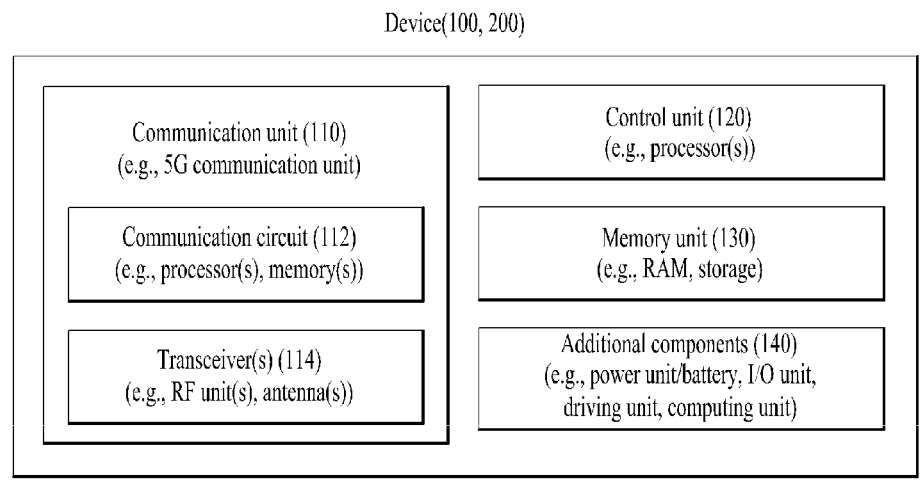
[FIG. 20]
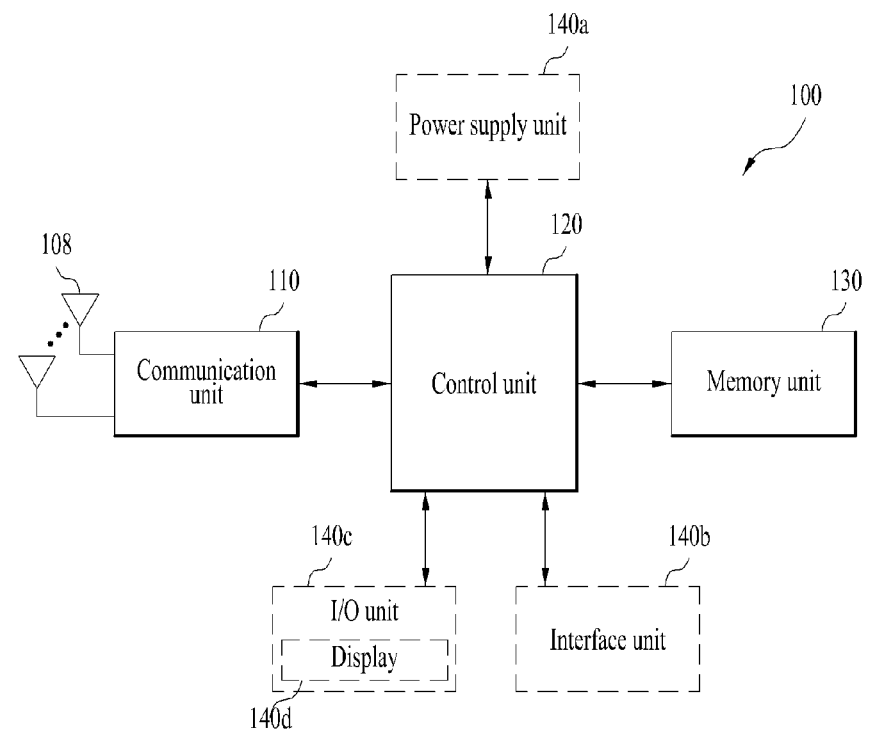

[FIG. 21]
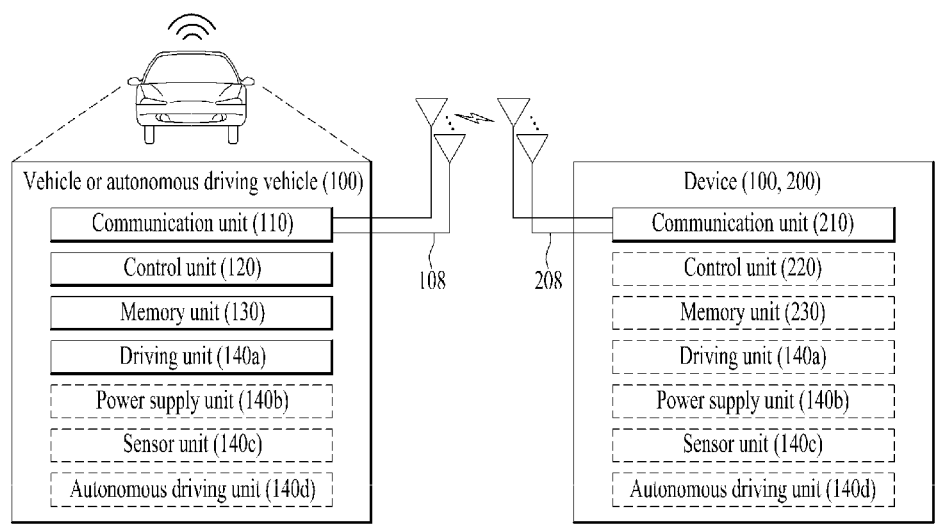

METHOD AND DEVICE FOR TRANSMITTING OR RECEIVING WIRELESS SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2020/005852, filed on May 4, 2020, which claims the benefit of Korean Patent Application No. 10-2019-0051841, filed on May 2, 2019. The disclosures of the prior applications are incorporated by reference in their entirety.

TECHNICAL FIELD

The present disclosure relates to a wireless communication system, and more particularly, to a method and apparatus for transmitting and receiving a wireless signal.

BACKGROUND ART

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at any time and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

DETAILED DESCRIPTION OF THE DISCLOSURE

Technical Problems

Provided are a method and apparatus for efficiently performing a wireless signal transmission and reception process.

The objects to be achieved with the present disclosure are not limited to what has been particularly described hereinabove and other objects not described herein will be more clearly understood by persons skilled in the art from the following detailed description.

Technical Solutions

According to a first aspect of the present disclosure, provided herein is a method of transmitting and receiving a signal by a user equipment (UE) in a wireless communication system, including receiving a period and additional information for a semi-persistent scheduling (SPS) operation from a base station (BS), determining a transmission resource based on the period and the additional information for the SPS operation, and receiving downlink data or transmitting uplink data on the transmission resource. Data traffic including the downlink data and the uplink data may have a period of a non-integer multiple of a reference time unit, and the additional information may be determined based on a period of the data traffic.

According to a second aspect of the present disclosure, provided herein is a user equipment (UE) operating in a wireless communication system, including a transceiver and a processor. The processor may be configured to receive a period and additional information for a semi-persistent scheduling (SPS) operation from a base station (BS), determine a transmission resource based on the period and the additional information for the SPS operation, and receive downlink data or transmit uplink data on the transmission resource. Data traffic including the downlink data and the uplink data may have a period of a non-integer multiple of a reference time unit, and the additional information may be determined based on a period of the data traffic.

According to a third aspect of the present disclosure, provided herein is an apparatus for a user equipment (UE), including at least one processor, and at least one computer memory operably connected to the at least one processor and configured to cause, based on execution, the at least one processor to perform an operation. The operation may include receiving a period and additional information for a semi-persistent scheduling (SPS) operation from a base station (BS), determining a transmission resource based on the period and the additional information for the SPS operation, and receiving downlink data or transmitting uplink data on the transmission resource. Data traffic including the downlink data and the uplink data may have a period of a non-integer multiple of a reference time unit, and the additional information may be determined based on a period of the data traffic.

According to a fourth aspect of the present disclosure, provided herein is a method of transmitting and receiving a signal by a base station (BS) in a wireless communication system, including transmitting a period and additional information for a semi-persistent scheduling (SPS) operation to a user equipment (UE), determining a transmission resource based on the period and the additional information for the SPS operation, and transmitting downlink data or receiving uplink data on the transmission resource. Data traffic including the downlink data and the uplink data may have a period of a non-integer multiple of a reference time unit, and the additional information may be determined based on a period of the data traffic.

According to a fifth aspect of the present disclosure, provided herein is a base station (BS) operating in a wireless communication system, including a transceiver and a processor. The processor may be configured to transmit a period and additional information for a semi-persistent scheduling (SPS) operation to a user equipment (UE), determine a transmission resource based on the period and the additional information for the SPS operation, and transmit downlink data or receive uplink data on the transmission resource. Data traffic including the downlink data and the uplink data may have a period of a non-integer multiple of a reference time unit, and the additional information may be determined based on a period of the data traffic.

According to a sixth aspect of the present disclosure, provided herein is an apparatus for a base station (BS), including at least one processor, and at least one computer memory operably connected to the at least one processor and configured to cause, based on execution, the at least one processor to perform an operation. The operation may include transmitting a period and additional information for a semi-persistent scheduling (SPS) operation to a user equipment (UE), determining a transmission resource based on the period and the additional information for the SPS operation, and transmitting downlink data or receiving uplink data on the transmission resource. Data traffic including the downlink data and the uplink data may have a period of a non-integer multiple of a reference time unit, and the additional information may be determined based on a period of the data traffic.

According to an embodiment, the determined transmission resource may have an aperiodic pattern in a time domain.

According to an embodiment, the period for the SPS operation may have a smallest value among integers larger than the period of the data traffic.

According to an embodiment, based on the period and the additional information for the SPS operation which are Y and Z, respectively, the transmission resource may be located at a timing at which a time determined based on an equation of ceil{Y/Z*n} or floor{Y/Z*n}(n=0, 1, . . . ) has elapsed from a timing determined based on the period for the SPS operation.

According to an embodiment, based on the period of the data traffic represented as an irreducible fraction, the period and the additional information for the SPS operation are determined as a numerator and a denominator of the irreducible fraction, respectively.

According to an embodiment, the reference time unit may include a slot or a symbol.

According to an embodiment, the period and the additional information for the SPS operation may be received through higher layer signaling.

Advantageous Effects

According to the present disclosure, a wireless signal may be efficiently transmitted and received in a wireless communication system.

According to various embodiments of the present disclosure, data traffic having a period of a non-integer multiple of a reference time unit may be efficiently processed using a semi-persistent scheduling (SPS) resource.

According to various embodiments of the present disclosure, latency occurring in a procedure of processing data traffic may be reduced even without greatly increasing additional signaling overhead.

The effects according to the present disclosure are not limited to what has been particularly described hereinabove and other effects not described herein will be more clearly understood by persons skilled in the art related to the present disclosure from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 1 is a diagram illustrating a radio frame structure in new RAT (NR);

FIG. 2 is a diagram illustrating a slot structure of an NR frame;

FIG. 3 is a diagram illustrating a self-contained slot structure;

FIG. 4 illustrates resource sharing for eMBB transmission and URLLC transmission;

FIG. 5 is a diagram illustrating an example of a preemption indication method;

FIG. 6 illustrates an example of a time/frequency set (timefrequency set) of a preemption indication;

FIG. 7 is a diagram illustrating an example of permitting a plurality of PUCCHs in a slot, for HARQ-ACK feedback;

FIGS. 8 and 9 are diagrams for explaining operation procedures of a UE and a BS according to an embodiment of the present disclosure;

FIGS. 10 and 11 are diagrams illustrating an example of the case in which a traffic pattern period is a non-integer multiple of a slot;

FIGS. 12 to 14 are diagram illustrating determination of a transmission resource according to an embodiment of the present disclosure;

FIGS. 15 and 16 are flowcharts illustrating operations of a UE and a BS according to an embodiment of the present disclosure;

FIG. 17 illustrates a communication system applied to the present disclosure;

FIG. 18 illustrates wireless devices applicable to the present disclosure;

FIG. 19 illustrates another example of wireless devices applied to the present disclosure;

FIG. 20 illustrates a portable device applied to the present disclosure; and

FIG. 21 illustrates a vehicle or an autonomous driving vehicle applied to the present disclosure.

BEST MODE FOR CARRYING OUT THE DISCLOSURE

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC- FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP LTE standard specifications, for example, 3GPP TS 36.211, 3GPP TS 36.212, 3GPP TS 36.213, 3GPP TS 36.321, 3GPP TS 36.300, 3GPP TS 36.331, etc. and 3GPP NR standard specifications, for example, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, Pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. For a UE in RRC CONNECTED state, not configured with CA or DC, only one serving cell including only the Pcell is present. For a UE in RRC CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., resource elements) that carry downlink control information (DCI), and the PDSCH refers to a set of time-frequency resources that carry DL data. The PUCCH, PUSCH, and PRACH refer to a set of time-frequency resources that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUSCH/PUCCH/PRACH, respectively. In addition, the meaning of "the BS transmits/receives the PBCH/PDCCH/PDSCH" is that the BS transmits the broadcast information/DL data/DCI on or through a PBCH/PDCCH/PDSCH, respectively.

As more and more communication devices have required greater communication capacity, there has been a need for eMBB communication relative to legacy radio access technology (RAT). In addition, massive MTC for providing various services at any time and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 is a diagram illustrating a radio frame structure in NR.

In NR, UL and DL transmissions are configured in frames. Each radio frame has a length of 10 ms and is defined as two 5-ms half-frames. Each half-frame is defined as five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols.

A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame, u}_{slot}$: number of slots in a frame
*$N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

FIG. 2 is a diagram illustrating a slot structure of an NR frame.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

FIG. 3 illustrates an example of the structure of a self-contained slot.

In an NR system, a frame is characterized by a self-contained structure in which a DL control channel, DL or UL data, a UL control channel, etc., can all be contained in one slot. For example, the first N symbols in a slot may be used to transmit a DL control channel (hereinafter referred to as a DL control area), and the last M symbols in a slot may be used to transmit UL control channels (hereinafter referred to as a UL control area). N and M may each be an integer of 0 or more. A resource area (hereinafter referred to as a data area) between the DL control area and the UL control area may be used for DL data transmission or UL data transmission. For example, the following configuration may be implemented. Each section is listed in chronological order.
1. DL only configuration
2. UL only configuration
3. Mixed UL-DL configuration
DL area+guard period (GP)+UL control area
DL control area+GP+UL area
DL area: (i) DL data area, (ii) DL control area+DL data area
UL area: (i) UL data area, (ii) UL data area+UL control area The PDCCH may be transmitted in the DL control region, and the PDSCH may be transmitted in the DL data region. Analogously, in the UL control region, the PUCCH may be transmitted, and in the UL data region, the PUSCH can be transmitted. The PDCCH may transmit Downlink Control Information (DCI), such as, for example, DL data scheduling information, UL data scheduling information, and the like. The PUCCH may transmit Uplink Control Information (UCI), such as, for example, ACK/NACK information, DL CSI information, and Scheduling Request (SR), and the like. The GP provides a time gap in the process of switching from a transmission mode to a reception mode, or switching from the reception mode to the transmission mode. A portion of symbols within a subframe can be set to GP for switching from DL to UL.

Hereinafter, physical channels that may be used in the 3GPP-based wireless communication system will be described in detail.

A PDCCH carries DCI. For example, the PDCCH carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/release of configured scheduling (CS), etc. DCI including resource allocation information about the DL-SCH is referred to as PDSCH scheduling DCI, and DCI including resource allocation information about the UL-SCH is referred to as PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRC is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for an RAR, the CRC is masked with a random access-RNTI (RA-RNTI).

If a PDCCH on one serving cell schedules a PDSCH or a PUSCH of another serving cell, this is referred to as cross-carrier scheduling. Cross-carrier scheduling using a carrier indicator field (CIF) may permit a PDCCH of a serving cell to schedule resources on another serving cell. On the other hand, if a PDSCH on a serving cell schedules the PDSCH or a PUSCH of the serving cell, this is referred to as self-carrier scheduling. If cross-carrier scheduling is used on a cell, the BS may provide information about a cell for scheduling the cell on which cross-carrier scheduling is used to the UE. For example, the BS may provide the UE with information as to whether a serving cell is scheduled by a PDCCH on another (scheduling) cell or by the serving cell or information as to which cell signals DL assignments and UL assignments for the serving cell when the serving cell is scheduled by another (scheduling) cell. In the present disclosure, a cell carrying a PDCCH is referred to as a serving cell, and a cell on which PUSCH or PDSCH transmission is scheduled by DCI included in the PDCCH, i.e., a cell carrying a PUSCH or a PDSCH scheduled by the PDCCH, is referred to as a scheduled cell.

A PDCCH is transmitted through a control resource set (CORESET). One or more CORESETs may be configured for the UE. A plurality of CORESETs for one UE may overlap in the time/frequency domain. The CORESET includes a set of physical resource blocks (PRBs) with a time duration of 1 to 3 OFDM symbols. The CORESET may be configured through system information (e.g., a master information block (MIB)) or a UE-specific higher layer (e.g., RRC layer) signaling. Specifically, the number of PRBs constituting the CORESET and a CORESET duration may be provided to the UE through higher layer (e.g., RRC) signaling.

The UE acquires DCI transmitted through a PDCCH by performing decoding (called blind decoding) on a set of PDCCH candidates. The set of the PDCCH candidates that the UE decodes is defined as a PDCCH search space set. The search space set may be a common search space (CS S) or a UE-specific search space (US S). The UE may acquire the DCI by monitoring PDCCH candidates in one or more search space sets configured by the MIB or higher layer signaling. Each CORESET configuration is associated with one or more search space sets and each search space set is associated with one CORESET configuration. The search space set is determined based on the following parameters provided by the BS to the UE.

controlResourceSetId: Indicator for identifying a CORESET associated with a search space set.

monitoringSlotPeriodicityAndOffset: A PDCCH monitoring period (slot unit) and a PDCCH monitoring offset (slot unit).

duration: The number of consecutive slots that a search space lasts in every occasion, i.e., upon every period as indicated by monitoringSlotPeriodicityAndOffset.

monitoringSymbolsWithinSlot: A PDCCH monitoring pattern in a slot, indicating the first symbol(s) of a CORESET in a slot for PDCCH monitoring.

nrofCandidates: The number of PDCCH candidates per control channel element (CCE) aggregation level. The number of PDCCH candidates per AL={1, 2, 4, 8, 16} (one value of 0, 1, 2, 3, 4, 5, 6, and 8).

The UE monitors PDCCH candidates only in PDCCH monitoring occasions. The UE determines the PDCCH monitoring occasions from a PDCCH monitoring period, a PDCCH monitoring offset, and a PDCCH monitoring pattern in a slot. For example, parameter monitoringSymbolsWithinSlot indicates the first symbol(s) for PDCCH monitoring in slots configured for PDCCH monitoring (e.g., refer to parameters monitoringSlotPeriodicityAndOffset and duration). For example, if monitoringSymbolsWithinSlot is 14 bits, the bits of monitoringSymbolsWithinSlot may represent 14 OFDM symbols of a slot, respectively, such that the most significant (left) bit represents the first OFDM symbol in the slot and the second most significant (left) bit represents the second OFDM symbol in the slot. For example, bit(s) set to 1 among the bits in monitoringSymbolsWithinSlot identify the first symbol(s) of the CORESET in the slot.

Table 3 shows features of each search space type.

TABLE 3

| Search space set | RNTI | Use Case |
| --- | --- | --- |
| Type0-PDCCH CSS set | SI-RNTI on a primary cell | SIB Decoding |
| Type0A-PDCCH CSS set | SI-RNTI on a primary cell | SIB Decoding |
| Type1-PDCCH CSS set | RA-RNTI or TC-RNTI on a primary cell | Msg2, Msg4 decoding in RACH |
| Type2-PDCCH CSS set | P-RNTI on a primary cell | Paging Decoding |
| Type3-PDCCH CSS set | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| USS set | C-RNTI, or MCS-C-RNTI, or CS-RNTI(s) | User specific PDSCH decoding |

Table 4 below shows DCI formats that a PDCCH may carry.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a transport block (TB)-based (or TB-level) PUSCH, and DCI format 0_1 may be used to schedule the TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule the TB-based (or TB-level) PDSCH or a CBG-based (or CBG-level) PDSCH. In the case of a CSS, DCI format 0_0 and DCI format 1_0 have a fixed size after a BWP size is initially given by RRC. In the case of a USS, in DCI format 0_0 and DCI format 1_0, the size of fields except for the size of a frequency domain resource assignment (FDRA) field is fixed, whereas the size of the FDRA field may be changed through a related parameter configuration by the BS. In DCI format 0_1 and DCI format 1_1, the size of a DCI field may be changed through various RRC reconfigurations by the BS. DCI format 2_0 may be used to transfer dynamic slot format information (e.g., slot format indicator (SFI) DCI) to the UE, and DCI format 2_1 may be used to transfer DL preemption information to the UE. DCI format 2_0 and/or DCI format 2_1 may be transmitted to UEs in a related group through a group common PDCCH, which is a PDCCH transmitted to UEs defined as one group.

A PDSCH is a physical layer DL channel for DL data transport. The PDSCH carries DL data (e.g., DL-SCH TB) and is subjected to modulation such as quadrature phase shift keying (QPSK), 16 quadrature amplitude modulation (QAM), 64 QAM, 256 QAM, etc. A codeword is generated by encoding a TB. The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

Hereinafter, a resource allocation method for DL transmission will be described in more detail.

A DL grant (called DL assignment) may be divided into (1) a dynamic grant and (2) a configured grant. The dynamic grant serves to maximize use of resources and represents a data transmission/reception method based on dynamic scheduling by the BS.

The BS schedules DL transmission through DCI. The UE receives, from the BS, DCI for DL scheduling (i.e., including scheduling information of a PDSCH) on the PDCCH. DCI format 1_0 or 1_1 may be used for DL scheduling. For example, DCI format 1_1 for DL scheduling may include an identifier for a DCI format, a bandwidth part indicator, frequency domain resource assignment, time domain resource assignment, and modulation and coding scheme (MCS) information.

The UE may determine a modulation order, a target code rate, and a TB size for the PDSCH based on an MCS field in the DCI. The UE may receive the PDSCH on a time-frequency resource according to frequency domain resource assignment information and time domain resource assignment information.

The configured grant may be referred to as semi-persistent scheduling (SPS). The UE may receive an RRC message including resource configuration for DL data transmission from the BS. For DL SPS, an actually configured grant may be provided by a PDCCH and may be activated or deactivated by the PDCCH. When DL SPS is configured, the BS provides the UE with parameters, such as a configured scheduling RNTI (CS-RNTI) and a period for activation, deactivation, and retransmission, through RRC signaling.

An actual DL grant of DL SPS may be provided to the UE by DCI on a PDCCH addressed to the CS-RNTI. The UE activates the CS-RNTI when specific fields of the DCI on the PDCCH addressed to the CS-RNTI are set to a specific value for scheduling activation. The UE may receive DL data on the PDSCH based on SPS.

URLLC (Ultra-Reliable and Low Latency Communication)

URLLC transmission defined in NR may imply transmission for (1) relatively low traffic size, (2) relatively low arrival rate, (3) ultra-low latency requirement (e.g., 0.5 or 1 ms), (4) relatively short transmission duration (e.g., 2 OFDM symbols), or (5) urgent service/message.

In the case of UL, in order to satisfy more stringent latency requirements, transmission for a specific type of traffic (e.g., URLLC) needs to be multiplexed with another type of previously scheduled transmission (e.g., enhanced mobile broadband (eMBB)). As one method in relation thereto, information indicating that a specific resource will be preempted is transmitted to a previously scheduled UE and a URLLC UE uses the corresponding resource for UL transmission.

FIG. 4 illustrates resource sharing for eMBB transmission and URLLC transmission.

When eMBB transmission and URLLC transmission have the same transmission duration, eMBB transmission and URLLC transmission may share non-overlapping time/frequency resources based on scheduling as illustrated in FIG. 4(a) Alternatively, in DL transmission, URLLC transmission may occur on resources for on-going eMBB transmission, to satisfy different latency and/or reliability requirements for eMBB transmission and URLLC transmission.

To this end, DCI format 2_1 may deliver information about resources (partially) overlapped with scheduled resources for DL eMBB transmission to the UE (for URLLC transmission). The UE assumes that there is no signal transmission in an RB and a symbol indicated by DCI format 2_1. The UE may exclude indicated coded bits from a soft buffer and (re)decode a PDSCH with reference to a DL preemption indication.

Preemption Indication

In NR, dynamic resource sharing is supported between eMBB and URLLC. eMBB and URLLC services may be scheduled on non-overlapping time/frequency resources and URLLC transmission may occur on resources scheduled for on-going eMBB traffic. An eMBB UE may not be aware of whether PDSCH transmission of the corresponding UE is partially punctured and the UE may fail to decode a PDSCH due to corrupted coded bits. In consideration of this problem, a preemption indication may be provided in NR. The preemption indication may also be referred to as an interrupted transmission indication.

In relation to the preemption indication, the UE receives a DownlinkPreemption information element (IE) from the BS through RRC signaling. Table 5 below illustrates an example of the DownlinkPreemption IE.

TABLE 5

-- ASN1START-- TAG-DOWNLINKPREEMPTION-STARTDownlinkPreemption
::= SEQUENCE { int-RNTI RNTI-Value, timeFrequencySet ENUMERATED {set0,
set1}, dci-PayloadSize INTEGER (0..maxINT-DCI-PayloadSize),
int-ConfigurationPerServingCell SEQUENCE (SIZE (1..maxNrofServingCells)) OF
INT-ConfigurationPerServingCell, ...}INT-ConfigurationPerServingCell ::=
SEQUENCE { servingCellID ServCellIndex, positionInDCI INTEGER
(0..maxINT-DCI-PayloadSize–1)}-- TAG-DOWNLINKPREEMPTION-STOP--
ASN1STOP Upon receiving the DownlinkPreemption IE, the UE may be configured with an INT-RNTI provided by a parameter int-RNTI in the DownlinkPreemption IE in order to monitor a PDCCH carrying DCI format 2_1. INT-ConfigurationPerServing Cell may include a set of serving cell indexes provided by servingCellID and the UE may be configured with a set of serving cells included in INT-ConfigurationPerServingCell and a set of positions for fields in DCI format 2_1 included in positionInDCI. The UE may be configured with an information payload size for DCI format 2_1 included in dci-PayloadSize and may be configured with indication granularity of time-frequency resources included in timeFrequencySect.

FIG. 5 is a diagram illustrating an example of a preemption indication method.

The UE may receive DCI format 2_1 from the BS based on a DownlinkPreemption IE.

Upon detecting DCI format 2_1 for a serving cell in a configured set of serving cells, the UE may assume that there is no transmission to the UE in PRBs and symbols, indicated by DCI format 2_1, among a set of PRBs and a set of symbols of the last monitoring period immediately prior to a monitoring period to which DCI format 2_1 belongs. For example, referring to FIG. 5, the UE decodes data based on signals received in the remaining resource regions under the assumption that a signal in a time-frequency resource indicated by preemption is not DL transmission scheduled therefor.

A combination of {M,N} is configured by an RRC parameter timeFrequencySet. {M,N} may be {14,1} or {7,2}.

FIG. 6 illustrates an example of a time/frequency set (timefrequency set) of a preemption indication.

A 14-bit bitmap for preemption indication indicates one or more frequency parts (N>=1) and/or one or more time-domain parts (M>=1). When {M,N}={14,1}, 14 parts in the time domain correspond to 14 bits of a 14-bit bitmap one by one as illustrated in the left side of FIG. 6, and a part corresponding to a bit set to 1 among the 14 bits is a part including preempted resources. When {M,N}={14,2}, as illustrated in the right side of FIG. 6, a time-frequency resource of a monitoring period is divided into 7 parts in the time domain and into 2 parts in the frequency domain, i.e., a total of 14 time-frequency parts. The 14 time-frequency parts in total correspond to 14 bits of the 14-bit bitmap one by one, and a part corresponding to a bit set to 1 among the 14 bits is a part including preempted resources.

A next-generation system aims at using a wide frequency band and supporting various services and requirements. As an example, URLLC, which is one of representative scenarios of NR, requires low-latency and ultra-reliability having a user-plane latency of 0.5 ms and X-byte data transmission within 1 ms at an error rate of $10^{-5}$ or less. Generally, eMBB has a large traffic capacity, whereas URLLC traffic has a traffic size within a few tens to a few hundred bytes and is sporadic. Thus, eMBB and URLLC have different characteristics. Therefore, transmission for maximizing transmission rate and minimizing control information overhead is required for eMBB and transmission having a short scheduling time unit and reliability is required for URLLC.

A variety of reference time units may be assumed/used to transmit and receive physical channels according to an application field or a traffic type. The reference time unit may be a basic unit for scheduling a specific physical channel and may vary with the number of symbols constituting the basic unit and/or with a subcarrier spacing (SCS). In an embodiment of the present disclosure, a slot and a mini-slot are described as the reference time unit, for convenience of description. The slot may be, for example, a basic scheduling unit used for normal data traffic (e.g. eMBB). The mini-slot may be a shorter time duration than the slot in the time domain and may be a basic scheduling unit used in traffic or communication schemes for a special purpose such as URLLC, unlicensed bands, or millimeter wave. However, the slot and the mini-slot are not limited to the above examples and the present disclosure may be extended even to the case in which eMBB transmits and receives a physical channel based on the mini-slot or the case in which URLLC or other communication schemes transmit and receive the physical channel based on the slot.

FIG. 7 is a diagram illustrating an example of permitting a plurality of PUCCHs in a slot, for HARQ-ACK feedback.

When stringent latency and high reliability, such as a URLLC service, are needed, an NR Rel-15 scheme of concentrating a plurality of transmissions of HARQ-ACK feedback only on one PUCCH in a slot may not be desirable in terms of PUCCH performance. Furthermore, in order to support a latency-critical service (e.g., URLLC), the BS may be required to transmit a plurality of PDSCHs with a short duration in a slot. Although the UE may transmit a PUCCH in random symbol(s) in a slot by configuration/indication of the BS, if the UE is allowed to transmit only a maximum of one PUCCH in a slot, it may be difficult to perform fast back-to-back scheduling and to perform HARQ-ACK feedback therefor. Accordingly, in order to flexibly and efficiently use resources and support services, it is better to allow transmission of a plurality of PUCCHs (or PUSCHs) including HARQ-ACK in a slot as illustrated in FIG. 7. Referring to an example illustrated in FIG. 7, for HARQ-ACK feedback for 5 received PDSCHs, 5 PUCCHs may be permitted in one slot.

Proposed Embodiment: SPS with Non-Integer Periodic Traffic

FIGS. 8 and 9 are diagrams for explaining operation procedures of a UE and a BS according to an embodiment of the present disclosure.

Referring to FIG. 8, the UE according to an embodiment may receive a semi-persistent scheduling (SPS)/configured grant (CG) configuration for a DL/UL data channel from the BS. In this case, a first period for an SPS/CG operation may be configured together with or separately from the SPS/CG configuration. The UE may also receive additional information configured to determine an actual transmission resource from the BS, together with or separately from the first period (S10). Next, the UE may determine the actual transmission resource for the DL/UL data channel based on the configured first period and additional information (S12) and receive the DL data channel or transmit the UL data channel on the determined actual transmission resource (S14).

The additional information may be determined by the BS based on a second period related with a traffic pattern, and the BS may inform the UE of the determined additional information. A method of determining the additional information and/or a specific method of determining the actual transmission resource in S12 may be determined based on embodiments to be described later.

Referring to FIG. 9, the BS according to embodiments to be described later may configure SPS/CG for a DL/UL data channel. In this case, a first period for an SPS/CG operation may be configured together with or separately from the SPS/CG configuration. Additional information for determining, by the UE, an actual transmission resource on which the DL/UL data channel is transmitted and received may be generated by the BS based on a second period, and the BS may inform the UE of the generated additional information (S20). Next, the BS may determine the actual transmission resource for the DL/UL data channel, based on the first period and the additional information (S22), and transmit the DL data channel or receive the UL data channel on the determined actual transmission resource (S24). A method of determining the additional information and/or a specific method of determining the actual transmission resource in S22 may be determined based on embodiments to be described later.

As one of use cases of URLLC, a time-sensitive network (TSN) may be included. The TSN may represent a communication network system for establishing motion control of devices or a collaborative robot in a factory by assuming a time-synchronized situation with the same clock time when all devices in a specific region perform real-time communication.

As one efficient method of transmitting data with a periodic traffic pattern, SPS or CG transmission for transmitting a DL/UL data channel on a preallocated time/frequency resource according to a preconfigured period, without a dynamic indication of a DL control channel, may be configured.

Most TSN scenarios include a periodic traffic pattern with a period of a non-integer multiple of a slot or a symbol currently supported in NR. However, current DL SPS/CG defines only a period corresponding to a multiple of the NR slot or symbol. Accordingly, it may be difficult to configure proper CG/SPS for supporting a data packet with a period of a non-integer multiple of the NR slot or symbol.

FIGS. 10 and 11 are diagrams illustrating an example of the case in which a period of a traffic pattern is not a multiple of a slot. Referring to FIG. 10, when a period X of a traffic pattern is configured as 2.5 slots and a period of Y of a CG/ is configured as 3 slots, latencies corresponding to 0.25, 0.75, 1.25, 1.75, 2.25, and 2.75 slots may occur in a procedure of processing first to seventh traffic which are periodically generated. Specifically, since the UE may transmit or receive traffic on an SPS resource which appears in every three slots by a CG/SPS configuration, first traffic 1000 illustrated in FIG. 10 may be transmitted or received on a first SPS resource 1001 appearing after a latency of 0.25 slots from a traffic occurrence timing. Second traffic 1010 may be transmitted or received on a second SPS resource 1001 appearing after a latency of 0.75 slots from the traffic occurrence timing. In contrast, as illustrated in FIG. 11, when the traffic pattern period X is configured as 2.5 slots and the period Y is configured as 2 slots shorter than the period X, latencies corresponding to 0.25, 1.75, 1.25, 0.75, 0.25, and 1.75 slots may occur in a procedure of processing the first to seventh traffic. That is, in the cases of FIG. 10 and FIG. 11, latencies occurring while the first to seventh traffic are processed are similar. However, when the period Y is configured as 2 slots as illustrated in FIG. 11, there is no traffic to be transmitted on some SPS transmission occasions (or some SPS resources). For example, referring to FIG. 11, since first traffic 1100 is transmitted on a first SPS resource 1101 appearing after a latency of 0.25 slots, and second traffic 1110 is transmitted on a third SPS resource 1121 appearing after a latency of 1.75 slots, there is no traffic to be transmitted on a second SPS resource 1111. Accordingly, efficiency may be lowered in terms of the use of resources.

In order to solve the above problems, a method of adjusting a transmission resource based on at least one of RRC reconfiguration in a higher layer, dynamic signaling, or multiple CG/SPS configurations may be considered. However, in the case of the RRC reconfiguration, excessively frequent reconfiguration may be needed to match a CG/SPS transmission resource to a traffic arrival time. In addition, the RRC reconfiguration may be undesirable upon considering a time required for reconfiguration and signaling overhead. In the case of multiple CG/SPS configurations, there may be a disadvantage that more resources than actually required resources are configured in order to satisfy latency. As another method, when a shorter period is configured for CG/SPS, latency may be reduced but more resources than necessary may need to be configured. When dynamic signaling is considered to match the CG/SPS transmission resource to the traffic arrival time, excessively frequent dynamic signaling may be needed and this may not meet the original purpose of CG/SPS to reduce overhead of a control channel.

[Proposal 1] To process traffic received with a period of a non-integer multiple of a slot or symbol currently supported in NR, a method of configuring a normal period of CG/SPS based on a period of a traffic pattern and determining an actual transmission resource based on the configured nominal period may be considered. Specifically, the BS may configure, for the UE, additional information (or additional parameter) Z for determining the actual transmission resource and determine the actual transmission resource based on the nominal period and the additional information Z. For example, a transmission occasion corresponding to the actual transmission resource may be determined as a timing adjusted by a predetermined time determined by the additional information Z, based on a timing according to activation DCI and the nominal period. More specifically, when a nominal period of CG/SPS is configured as Y, a transmission occasion may be defined as a timing separated (or elapsing) by a time determined by a function ceil{Y/Z*n} (where n=0, 1, . . . ) from a timing determined by the activation DCI. When a period X of a traffic pattern is expressed as an irreducible fraction, a numerator and a denominator of the irreducible fraction may be defined as Y and Z, respectively. A rule may be defined such that the BS configures the nominal period Y of CG/SPS and the additional information Z for the UE and the UE determines an actual CG/SPS transmission resource based on the values of Y and Z. For example, the nominal period Y of CG/SPS and the additional information Z may be transmitted to the UE through higher layer signaling and the UE may determine the actual CG/SPS transmission resource based on the values of Y and Z transmitted by the BS. Consequently, the actual CG/SPS transmission resource has an irregular aperiodic pattern. A predetermined number of actual transmission resources may appear within the nominal period and as many CG/SPS transmissions as the number of actual transmission resources appearing during the nominal period may occur.

For example, when X is 2.5 slots, X may be represented as an irreducible fraction 5/2 and Y and Z may be defined as 5 slots and 2 slots, respectively. In this case, the actual CG/SPS transmission resource may be determined as illustrated in FIG. 12 and latency may be further reduced than in the case illustrated in FIG. 10 or FIG. 11 because latencies corresponding to 0.25, 0.75, 0.25, 0.75, 0.25, 0.75 slots occur while the first to seventh traffic are processed.

According to another embodiment, when the nominal period of CG/SPS is configured as Y, a transmission occasion corresponding to an actual transmission resource may be defined as a timing separated (or elapsing) by a time determined by a function ceil{Y/Z*n} (where n=0, 1, . . . ) from a timing determined by the activation DCI. The BS may configure the nominal period Y of CG/SPS and the additional information Z for the UE and the UE may determine the actual CG/SPS transmission resource based on the values of Y and Z configured by the BS. For example, when X is 2.5 slots, since X may be represented as an irreducible fraction 5/2, Y and Z may be defined as 5 slots and 2 slots, respectively. In this case, the actual CG/SPS transmission resource may be determined as illustrated in FIG. 13 and latencies corresponding to 0.75, 0.25, 0.75, 0.25, 0.75, and 0.25 slots may occur. Therefore, latencies similar to levels of the example illustrated in FIG. 12 occur and may further be reduced than in the example illustrated in FIG. 10 or FIG. 11.

[Proposal 2] To process traffic received with a period of a non-integer multiple of a slot or symbol currently supported in NR, a method of determining an actual transmission resource based on a combination of CG/SPS periodicities currently supported in NR may be considered. Characteristically, when a set of currently supported CG/SPS periodicities is {P_1, P_2, ..., P_n} an actual CG/SPS transmission resource may be determined based on a traffic pattern period X within the set. For example, the actual CG/SPS transmission resource may be determined based on CG/SPS periodicities P_k and P_{k+1} satisfying P_k≤X≤P_{k+1} out of the set.

More specifically, during a time duration A, the actual CG/SPS transmission resource may be determined as a period of P_k and, during a time duration B, the actual CG/SPS transmission resource may be determined as a period of P_{k+1}. In this case, P_k, P_{k+1}, the length of the time duration A, and the time duration B may be predefined/agreed on based on the traffic pattern period X. For example, referring to FIG. 14, when X is 2.25 slots, P_k and P_{k+1} may be determined as 2 slots and 3 slots, respectively, and time durations A and B may be determined as 6 slots and 3 slots, respectively. As time elapses, the time durations A and B may repeatedly appear. Referring to FIG. 14, during the time duration A including the first 6 slots, a CG/SPS resource appears with a period of 2 slots, during the time duration B including the next 3 slots, the CG/SPS resource appears with a period of 3 slots, and then the time duration A including the next 6 slots, the CG/SPS resource appears with a period of 2 slots. During the time duration B, a larger latency may be prevented from occurring by adjusting a period of the CG/SPS resource to 3 slots from 2 slots.

While P_k, P_{k+1} and the lengths of the time durations A and B may be configured/indicated through a higher/physical layer signal, an embodiment is not limited thereto. For example, the BS may transmit information about the lengths of the time durations A and B and information about P_k and P_{k+1} to the UE through RRC signaling, and the UE may determine the actual CG/SPS transmission resource based on the information received through RRC signaling. Thus, during the time duration A, the UE may receive or transmit data through the CG/SPS resource at a period of P_k and, during the time duration B, the UE may receive or transmit data through the CG/SPS resource at a period of P_{k+1}.

FIG. 15 is a flowchart illustrating operations of a UE and a BS according to an embodiment of the present disclosure.

Referring to FIG. 15, the UE according to an embodiment may receive a period and additional information for an SPS operation from the BS (S1500). The additional information may represent information used to determine a resource for actually transmitting data. The period for the SPS operation may represent a period at which an SPS resource (or SPS transmission occasion) appears, which corresponds to the above-described nominal period, and may be configured by the BS. The period and the additional information for the SPS operation may be transmitted to the UE through higher layer signaling (e.g., RRC signaling). The period and the additional information for the SPS operation may be transmitted altogether and individually to the UE.

The UE may determine a transmission resource based on the period and the additional information for the SPS operation, received from the BS (S1510). The transmission resource may represent a resource actually used to transmit and receive data traffic which periodically occurs. The data traffic may include DL data and UL data. For example, the DL data may include an SPS PDSCH but an embodiment is not limited thereto. Since an occurrence period of the data traffic may have a value of a non-integer multiple of a reference time unit and the period for the SPS operation is configured as an integer multiple of the reference time unit, the period for the SPS operation may not be proper to transmit and receive the data traffic. In this case, the reference time unit may represent a slot or a symbol used in NR, but an embodiment is not limited thereto. For example, when the occurrence periodicity of the data traffic is 2.5 slots and the period for the SPS operation is configured as 2 slots by the BS, since the period for the SPS operation and the occurrence period of the data traffic do not match, latency may continuously occur upon processing the data traffic. Then, the additional information may be used to adjust a timing at which data is actually transmitted or received based on a preconfigured period for the SPS operation. More specifically, a transmission occasion corresponding to the transmission resource may be determined as a timing adjusted by a predetermined time determined based on the additional information, based on a timing according to activation DCI and the period for the SPS operation. For example, the transmission occasion may be determined as a timing when a time determined by a function of ceil{Y/Z*n} (where n=0,1, ... ) has elapsed from a timing according to the activation DCI and the period for the SPS operation. Alternatively, according to an embodiment, while the transmission occasion may be determined as a timing when a time determined by a function of floor{Y/Z*n} (where n=0,1, ... ) has elapsed from a timing according to the activation DCI and the period for the SPS operation, an embodiment is not limited thereto.

The additional information may be determined by the BS based on the occurrence period of the data traffic. For example, when the occurrence period of the data traffic, the period for the operation, and the additional information are represented as X, Y, and Z, and X having a non-integer multiple of the reference time unit is represented as an irreducible fraction, Y and Z may be determined as a numerator and a denominator of the irreducible fraction, respectively, but an embodiment is not limited thereto.

The UE may receive DL data or transmit UL data on the determined transmission resource. In this case, the DL data and the UL data may represent SPS DL data and SPS UL data, respectively. For example, the SPS DL data may include an SPS PDSCH and the SPS UL data may include an SPS PUSCH, but an embodiment is not limited thereto. According to the above embodiment, latency occurring when periodically generated data traffic is processed may be reduced by adjusting the transmission resource based on the period and the additional information for the SPS operation. Since an operation for configuring and receiving the additional information Z will not generate significant signaling overhead, the above embodiment may be efficient in terms of signaling overhead.

FIG. 16 is a flowchart illustrating an operation of the BS according to an embodiment of the present disclosure.

Referring to FIG. 16, the BS according to an embodiment may transmit a period and additional information for an SPS operation to the UE (S1600). The period and the additional information for the SPS operation may be transmitted to the UE through higher layer signaling (e.g., RRC signaling). The period and the additional information for the SPS operation may be transmitted altogether and individually.

The BS may determine a transmission resource based on the period and the additional information for the SPS operation (S1610). More specifically, a transmission occasion corresponding to the transmission resource may be determined as a timing adjusted by a predetermined time determined based on the additional information, based on a timing according to activation DCI and the period for the SPS operation. For example, the transmission occasion may be determined as a timing when a time determined by a function of ceil {Y/Z*n} (where n=0,1, . . . ) has elapsed from a timing according to the activation DCI and the period for the SPS operation. Alternatively, according to an embodiment, while the transmission occasion may be determined as a timing when a time determined by a function of floor{Y/Z*n} (where n=0,1, . . . ) has elapsed from a timing according to the activation DCI and the period for the SPS operation, an embodiment is not limited thereto.

The BS may transmit DL data or receive UL data on the determined transmission resource (S1620).

In the present disclosure, a target service (e.g., URLLC), quality of service (QoS), a block error rate (BLER) requirement, reliability requirement, latency requirement, and/or processing time, for a specific channel, may be configured through a higher layer signal, may be explicitly indicated through a specific field of DCI, may be distinguished through a search space to which a PDCCH (for scheduling DL/UL data) belongs, may be distinguished by a CORESET to which the PDCCH (for scheduling the DL/UL data) belongs, may be distinguished by an RNTI, may be distinguished by a DCI format, or may be distinguished through CRC masking of the PDCCH.

Various embodiments of the present disclosure may also be applied to handling for a plurality of types of channels, distinguished by a specific field of DCI, a search space to which a PDCCH belongs, a CORESET to which the PDCCH belongs, an RNTI, a DCI format, or CRC masking of the PDCCH, without explicitly distinguishing the target service, QoS, BLER requirement, reliability requirement, latency requirement, and/or processing time, for a channel. In the various embodiments of the present disclosure, "a channel corresponding to a specific target service, QoS, BLER requirement, reliability requirement, latency requirement, and/or processing time" may be applied by being replaced with "a specific channel distinguished by a specific field of DCI, a search space to which a PDCCH belongs, a CORESET to which the PDCCH belongs, an RNTI, a DCI format, or CRC masking of the PDCCH, among a plurality of channels".

While the operation of the above proposals or disclosure has been described in terms of the "UE" or "BS", the operation may be performed or implemented by a transmission or reception device, a (digital signal) processor, a microprocessor, etc., which will be described later, instead of the "UE" and "BS". "UE" may be used interchangeably with a mobile device such as a mobile station (MS), a user equipment (UE), or a mobile terminal as a general term, and "BS" may be used interchangeably with a device such as a base station (BS), an evolved NodeB (eNB), a next generation eNode B (ng-eNB), or a next generation NodeB (gNB) as a general term.

Examples of the above-described proposed methods may also be included in one of implementation methods of the present disclosure and, therefore, it is obvious that the examples are regarded as the proposed methods. In addition, although the above-described proposed methods may be independently implemented, the proposed methods may be implemented in the form of a combination (or aggregate) of some of the proposed methods. A rule may be defined such that information as to whether the proposed methods are applied (or information about rules of the proposed methods) may be indicated to the UE by the BS through a predefined signal (e.g., physical layer or higher layer signal). The proposed methods described in the embodiments of the present disclosure and methods extensible from the proposed methods may be implemented as a device, and the present disclosure includes the contents of the implemented device. The device will be described below with reference to the attached drawings.

Various descriptions, functions, procedures, proposals, methods, and/or operational flowcharts disclosed in the present disclosure may be applied to a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 17 illustrates a communication system applied to the present disclosure.

Referring to FIG. 17, the communication system applied to the present disclosure includes wireless devices, base stations (BSs), and a network. The wireless devices refer to devices performing communication by radio access technology (RAT) (e.g., 5G New RAT (NR) or LTE), which may also be called communication/radio/5G devices. The wireless devices may include, but no limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured by using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between the BSs 200. Herein, the wireless communication/connections may be established through various RATs (e.g., 5G NR) such as UL/DL communication 150a, sidelink communication 150b (or, D2D communication), or inter-BS communication 150c (e.g. relay, integrated access backhaul (IAB)). A wireless device and a BS/a wireless devices, and BSs may transmit/receive radio signals to/from each other through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 18 illustrates wireless devices applicable to the present disclosure.

Referring to FIG. 18, a first wireless device 100 and a second wireless device 200 may transmit radio signals through a variety of RATs (e.g., LTE and NR). Here, the {first wireless device 100, second wireless device 200} may correspond to the {wireless device 100x, BS 200} and/or {wireless device 100x, wireless device 100x} of FIG. 17.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 19 illustrates another example of wireless devices applied to the present disclosure. The wireless devices may be implemented in various forms according to use-cases/services (refer to FIG. 17).

Referring to FIG. 19, wireless devices 100 and 200 may correspond to the wireless devices 100 and 200 of FIG. 18 and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically coupled to the communication unit 110, the memory unit 130, and the additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcasting terminal, a hologram device, a public safety device, an MTC device, a medicine device, a FinTech device (or a finance device), a security device, a climate/environment device, the AI server/device (400 of FIG. 17), the BSs (200 of FIG. 17), a network node, etc. The wireless device may be mobile or fixed according to a use-case/service.

In FIG. 19, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled wiredly, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

An implementation example of FIG. 19 will be described in detail with reference to the drawings.

FIG. 20 illustrates a portable device applied to the present disclosure. The portable device may include a smartphone, a smartpad, a wearable device (e.g., a smart watch and smart glasses), and a portable computer (e.g., a laptop). The portable device may be referred to as a mobile station (MS), a user terminal (UT), a mobile subscriber station (MSS), a subscriber station (SS), an advanced mobile station (AMS), or a wireless terminal (WT).

Referring to FIG. 20, a portable device 100 may include an antenna unit 108, a communication unit 110, a control unit 120, a power supply unit 140a, an interface unit 140b, and an I/O unit 140c. The antenna unit 108 may be configured as a part of the communication unit 110. The blocks 110 to 130/140a to 140c correspond to the blocks 110 to 130/140 of FIG. 19, respectively.

The communication unit 110 may transmit and receive signals (e.g., data and control signals) to and from another wireless device and a BS. The control unit 120 may perform various operations by controlling elements of the portable device 100. The control unit 120 may include an application processor (AP). The memory unit 130 may store data/parameters/programs/code/commands required for operation of the portable device 100. Further, the memory unit 130 may store input/output data/information. The power supply unit 140a may supply power to the portable device 100, and include a wired/wireless charging circuit and a battery. The interface unit 140b may include various ports (e.g., an audio I/O port and a video I/O port) for connectivity to external devices The I/O unit 140c may acquire information/signals (e.g., touch, text, voice, images, and video) input by a user, and store the acquired information/signals in the memory unit 130. The communication unit 110 may receive or output video information/signal, audio information/signal, data, and/or information input by the user. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signal sin the memory unit 130. The communication unit 110 may convert the information/signals to radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

FIG. 21 illustrates a vehicle or an autonomous driving vehicle applied to the present disclosure. The vehicle or autonomous driving vehicle may be configured as a mobile robot, a car, a train, a manned/unmanned aerial vehicle (AV), a ship, or the like.

Referring to FIG. 21, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to travel on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire vehicle state information, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement a technology for maintaining a lane on which a vehicle is driving, a technology for automatically adjusting speed, such as adaptive cruise control, a technology for autonomously traveling along a determined path, a technology for traveling by automatically setting a path, when a destination is set, and the like.

For example, the communication unit 110 may receive map data, traffic information data, and so on from an external server. The autonomous driving unit 140d may generate an autonomous driving path and a driving plan from the obtained data. The control unit 120 may control the driving unit 140a such that the vehicle or autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain vehicle state information and/or ambient environment information. The autonomous driving unit 140d may update the autonomous driving path and the driving plan based on the newly obtained data/information. The communication unit 110 may transmit information about a vehicle position, the autonomous driving path, and/or the driving plan to the external server. The external server may predict traffic information data using AI technology or the like, based on the information collected from vehicles or autonomous driving vehicles and provide the predicted traffic information data to the vehicles or the autonomous driving vehicles.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment. It is obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is mainly made of a data transmission and reception relationship between a BS and a UE. This transmission and reception relationship is extended in the same/similar manner to signal transmission and reception between a UE and a relay or between a BS and a relay. A specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with a fixed station, a Node B, an eNode B (eNB), gNode B (gNB), an access point, etc. Further, the term UE may be replaced with a UE, a mobile station (MS), a mobile subscriber station (MSS), etc.

The embodiments of the present disclosure may be implemented through various means, for example, hardware, firmware, software, or a combination thereof. In a hardware configuration, an embodiment of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present disclosure may be implemented in the form of a module, a procedure, a function, and so on which performs the above-described functions or operations. Software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used in a UE, a BS, or other equipment in a wireless mobile communication system.

The invention claimed is:

1. A method performed by a user equipment (UE) to transmit and receive a signal in a wireless communication system, the method comprising:
   receiving, from a base station (BS), a period and additional information for a semi-persistent scheduling (SPS) operation;
   determining a transmission resource based on the period and the additional information for the SPS operation; and
   receiving downlink data or transmitting uplink data on the transmission resource,
   wherein data traffic including the downlink data and the uplink data has a period of a non-integer multiple of a reference time unit,
   wherein the additional information is determined based on the period of the data traffic, and
   wherein, based on the period and the additional information for the SPS operation which are Y and Z, respectively, the transmission resource is located at a timing when a time determined based on an equation of ceil{Y/Z*n} or floor{Y/Z*n} (where n=0, 1 . . . ) has elapsed from a timing determined based on the period for the SPS operation.

2. The method of claim 1,
   wherein the determined transmission resource has an aperiodic pattern in a time domain.

3. The method of claim 1,
   wherein the period for the SPS operation has a smallest value among integers larger than the period of the data traffic.

4. The method of claim 1,
   wherein, based on the period of the data traffic represented as an irreducible fraction, the period and the additional information for the SPS operation are determined as a numerator and a denominator of the irreducible fraction, respectively.

5. The method of claim 1,
   wherein the reference time unit includes a slot or a symbol.

6. The method of claim 1,
   wherein the period and the additional information for the SPS operation are received through higher layer signaling.

7. A user equipment (UE) configured to transmit and receive a signal in a wireless communication system, the UE comprising:
   at least one transceiver;
   at least one processor; and
   at least one computer memory operatively connected to the at least one processor and configured to store instructions that, when executed, cause the at least one processor to perform operations comprising:
   receiving, from a base station (BS), a period and additional information for a semi-persistent scheduling (SPS) operation;
   determining a transmission resource based on the period and the additional information for the SPS operation; and
   receiving downlink data or transmitting uplink data on the transmission resource,
   wherein data traffic including the downlink data and the uplink data has a period of a non-integer multiple of a reference time unit,
   wherein the additional information is determined based on the period of the data traffic, and
   wherein, based on the period and the additional information for the SPS operation which are Y and Z, respectively, the transmission resource is located at a timing when a time determined based on an equation of ceil{Y/Z*n} or floor{Y/Z*n} (where n=0, 1 . . . ) has elapsed from a timing determined based on the period for the SPS operation.

8. An apparatus for a user equipment (UE), the apparatus comprising:
   at least one processor; and
   at least one computer memory operably connected to the at least one processor and configured to cause, based on execution, the at least one processor to perform operations comprising:
   receiving, from a base station (BS), a period and additional information for a semi-persistent scheduling (SPS) operation;
   determining a transmission resource based on the period and the additional information for the SPS operation; and
   receiving downlink data or transmitting uplink data on the transmission resource,
   wherein data traffic including the downlink data and the uplink data has a period of a non-integer multiple of a reference time unit,
   wherein the additional information is determined based on the period of the data traffic, and wherein, based on the period and the additional information for the SPS operation which are Y and Z, respectively, the transmission resource is located at a timing when a time determined based on an equation of ceil{Y/Z*n} or floor{Y/Z*n} (where n=0, 1 . . . ) has elapsed from a timing determined based on the period for the SPS operation.

9. A method performed by a base station (BS) to transmit and receive a signal in a wireless communication system, the method comprising:
  transmitting, to a user equipment (UE), a period and additional information for a semi-persistent scheduling (SPS) operation;
  determining a transmission resource based on the period and the additional information for the SPS operation; and
  transmitting downlink data or receiving uplink data on the transmission resource,
  wherein data traffic including the downlink data and the uplink data has a period of a non-integer multiple of a reference time unit,
  wherein the additional information is determined based on the period of the data traffic, and
  wherein, based on the period and the additional information for the SPS operation which are Y and Z, respectively, the transmission resource is located at a timing when a time determined based on an equation of ceil{Y/Z*n} or floor{Y/Z*n} (where n=0, 1 . . . ) has elapsed from a timing determined based on the period for the SPS operation.

10. The method of claim 9,
  wherein the transmission resource has an aperiodic pattern in a time domain.

11. The method of claim 9,
  wherein, based on the period of the data traffic represented as an irreducible fraction, the period and the additional information for the SPS operation are determined as a numerator and a denominator of the irreducible fraction, respectively.

12. A base station (BS) configured to operate in a wireless communication system, the BS comprising:
  at least one transceiver;
  at least one processor; and
  at least one computer memory operatively connected to the at least one processor and configured to store instructions that, when executed, cause the at least one processor to perform operations comprising:
    transmitting, to a user equipment (UE), a period and additional information for a semi-persistent scheduling (SPS) operation;
    determining a transmission resource based on the period and the additional information for the SPS operation; and
    transmitting downlink data or receiving uplink data on the transmission resource,
    wherein data traffic including the downlink data and the uplink data has a period of a non-integer multiple of a reference time unit,
    wherein the additional information is determined based on the period of the data traffic, and
    wherein, based on the period and the additional information for the SPS operation which are Y and Z, respectively, the transmission resource is located at a timing when a time determined based on an equation of ceil{Y/Z*n} or floor{Y/Z*n} (where n=0, 1 . . . ) has elapsed from a timing determined based on the period for the SPS operation.

13. An apparatus for a base station (BS), the apparatus comprising:
  at least one processor; and
  at least one computer memory operably connected to the at least one processor and configured to cause, based on execution, the at least one processor to perform operations comprising:
    transmitting, to a user equipment (UE), a period and additional information for a semi-persistent scheduling (SPS) operation;
    determining a transmission resource based on the period and the additional information for the SPS operation; and
    transmitting downlink data or receiving uplink data on the transmission resource,
    wherein data traffic including the downlink data and the uplink data has a period of a non-integer multiple of a reference time unit,
    wherein the additional information is determined based on the period of the data traffic, and
    wherein, based on the period and the additional information for the SPS operation which are Y and Z, respectively, the transmission resource is located at a timing when a time determined based on an equation of ceil{Y/Z*n} or floor{Y/Z*n} (where n=0, 1 . . . ) has elapsed from a timing determined based on the period for the SPS operation.

* * * * *